July 12, 1938.  W. H. KNOX, JR., ET AL  2,123,785
REMOVAL OF FLUORINE FROM PHOSPHORIC ACID
Filed March 2, 1936
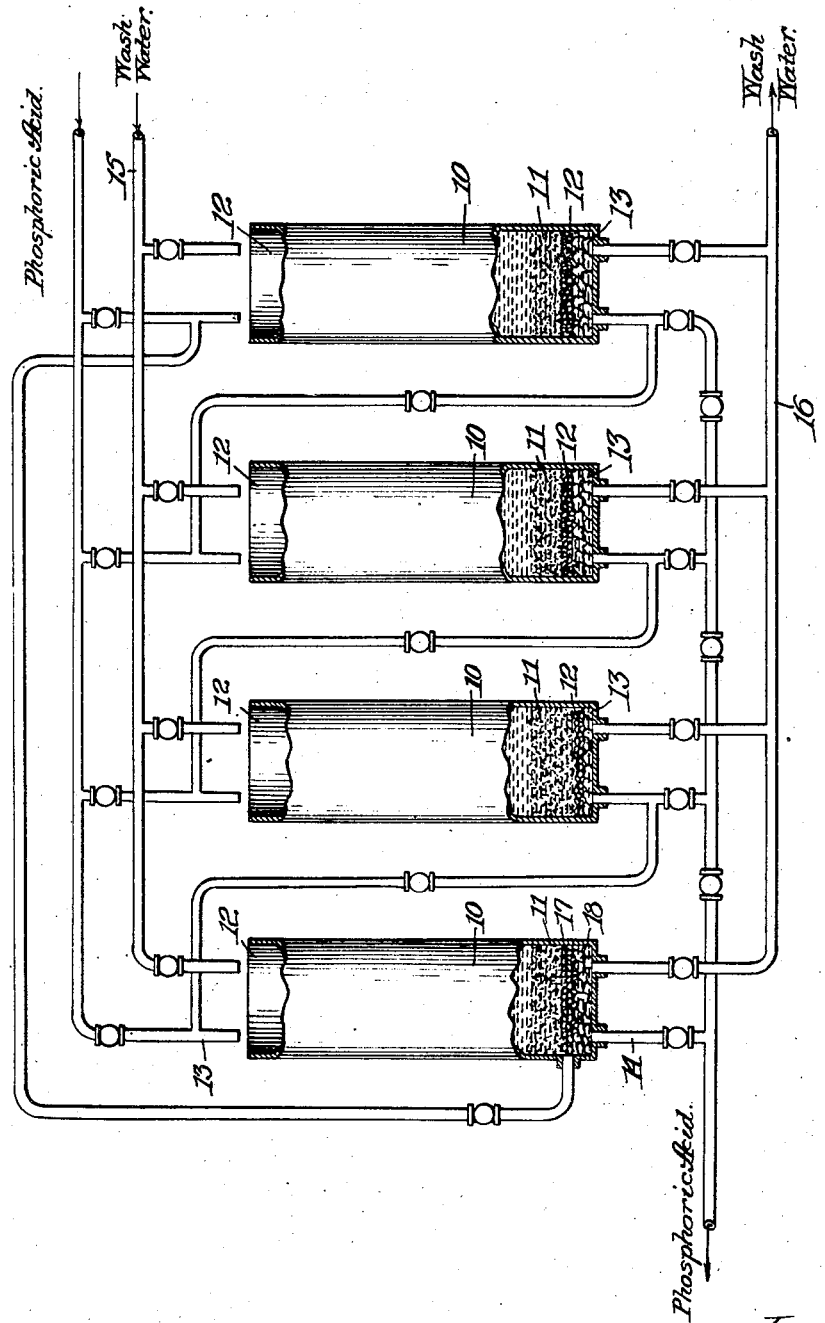

Patented July 12, 1938

2,123,785

UNITED STATES PATENT OFFICE 2,123,785

REMOVAL OF FLUORINE FROM PHOSPHORIC ACID

William H. Knox, Jr., and Warren Standish Miller, Nashville, Tenn., assignors to Victor Chemical Works, a corporation of Illinois Application March 2, 1936, Serial No. 66,763

11 Claims. (Cl. 23—165)

This invention relates to an improved method of removing fluorine from phosphoric acid.

It has heretofore been proposed to remove fluorine from phosphoric acid by precipitation therefrom of a salt of hydrofluosilicic acid under boiling temperatures and by the precipitation of sodium fluoride. These methods, however, are limited in their application to the treatment of excessively high fluorine content acids, and are not applicable to the reduction of fluorine content below say 200 parts per million.

In accordance with this invention, an inexpensive method of lowering fluorine content far below 200 parts per million is provided.

It has now been discovered that the addition of hydrated silica in much greater quantity than the chemical equivalent of the fluorine in the phosphoric acid accomplishes the lowering of the fluorine content to as little as five parts per million. This is lower than the solubility of any known fluorine compound in phosphoric acid, and it is believed that the fluorine compounds are adsorbed from solution by a portion of the hydrated silica. This theoretical conclusion is in accordance with such evidence as has been discovered. It is believed that the hydrated silica reacts with hydrofluoric acid and the resulting product is adsorbed by the remaining silica, since the content of soluble silica is less after the treatment.

The amount of hydrated silica required is generally at least ten times that theoretically required to form the chemical reaction products normally predictable from the reaction.

In order to reduce the fluorine content as low as five parts per million, an active adsorbent hydrated silica should be employed. For example, a prepared hydrated silica, such as silica gel, precipitated silicic acid, and the like, are considerably more active than natural materials such as kieselguhr and other diatomaceous earths. In general, over twice as much kieselguhr is required as is necessary when precipitated silicic acid is used, to effect equal reduction of fluorine in phosphoric acid.

Suitable hydrated silicas may be prepared in a number of manners. For example, one type may be prepared in flake form by digesting the mineral vermiculite with sulfuric acid to dissolve out the basic metal constitutents. The product is an excellent absorbent material. Another highly satisfactory material may be prepared by treating water glass or a sodium silicate solution with sulfuric or hydrochloric acid to form an insoluble hydrated silica in gel or solid form. This precipitated silicic acid may be washed thoroughly to remove the soluble alkali salts, if desired, but may be used without washing where an increase in the alkali metal content of the phosphoric acid is not important. The gelatinous or solid silicic acid produced in this manner may be used successfully without further treatment for the adsorption of fluorine. It is preferred, however, to dry the product and crush the lumps that are formed in order to obtain a granular or powdered form of hydrated silica. Silicic acid in this form is more easily handled and lends itself to greater variation in the method of treating the phosphoric acid. While the addition of one large amount of hydrated silica to the phosphoric acid will satisfactorily reduce the fluorine content, it has been discovered that fluorine removal may be effected more efficiently if the acid is treated with successive small portions of the silica. This indicates that the removal of the fluorine is not a mass action phenomenon, but rather is due to adsorption.

As an example of the batch treatment of phosphoric acid, an acid of approximately 58° Bé. containing 138 parts per million of fluorine was treated with 0.2% by weight of powdered silicic acid and agitated. This treatement reduced the fluorine content of the acid to 59 p. p. m. A second addition of 0.2% by weight of fresh silicic acid caused a reduction of the fluorine to 33 p. p. m. A third addition of 0.1% by weight reduced the fluorine content to 13 p. p. m., and a fourth addition of 0.1% brought the fluorine content down to 5 p. p. m. Thus a total addition of 0.6% of silicic acid caused a reduction in the fluorine from 138 p. p. m. to less than 5 p. p. m.

In a corresponding sample of acid, a single addition of 1.0% of silicic acid reduced the fluorine to only 22 p. p. m. The greater efficiency in the step treatment indicates the existence of some relation between adsorbed fluorine and the concentration of the fluorine in the solution, since the percentage of fluorine removed is not dependent on the total adsorption capacity of the acid. The presence or removal of the initial additions of silicic acid in the step treatment does not effect the situation. However, it is preferred to settle and decant the portions separately. This step, of course, is avoided in the apparatus shown in the drawing, which will be hereinafter discussed.

The spent siliceous residue may be reactivated by washing with water or dilute aqueous solutions of acids or salts such as sulfuric acid, sodium carbonate, sodium biborate, and the like, to remove the adsorbed fluorine compounds and then may be used again for further adsorption of fluorine.

A satisfactory apparatus for carrying out the invention is illustrated diagrammatically in the drawing, in which the figure illustrates a series of filter beds 10 containing flaked siliceous material 11 overlying a bed of pebbles 17 and gravel 18. Each of the beds is illustrated in the form of an open bed 12 provided with a phosphoric acid inlet 13 and outlet 14 and auxiliary lines 15 and 16 through which washing fluid may be introduced, which may be concurrent or countercurrent to the flow of the phosphoric acid.

The apparatus may likewise be a single succession of filter beds made up with granular or powdered hydrated silica, separated, if desired, by screens or beds of inert material.

In operating such a system, the acid is passed through the first tower or bed and there loses a major portion of its fluorine, after which it is passed to a second tower and so on until its fluorine content has been reduced to the proper degree.

In the preferred system more filtering beds are provided than are necessary under the most adverse conditions to be encountered, and after the capacity of the first bed is exhausted the entering acid is directed to the second bed, while the first is being reactivated by washing with water. By this means, a practical continuous commercial process for the removal of fluorine is provided.

As an example of this type of treatment, three beds in series, utilizing a filtering medium of granular silicic acid prepared by acidulating a solution of sodium silicate with sulfuric acid and drying the mixture, have produced a phosphoric acid containing less than 5 p. p. m. of fluorine from an acid originally containing between 200 and 500 p. p. m., in continuous operation. The silicic acid replacement or regeneration rate required was less than 0.6%, based on the weight of the acid processed, including loss due to washing. A set of beds utilizing a hydrated flaked silica was operated to produce a phosphoric acid containing only 3 p. p. m. of fluorine from a similarly impure acid as in the previous case, with a silica replacement or regeneration rate of less than 0.5% of the weight of the acid processed. The beds used had a depth of about 30 inches each, and the phosphoric acid passed through them at a rate of approximately 1,500 pounds of strong acid per foot of area per 24 hours.

The operation is preferably carried out with a strong phosphoric acid, say over 25 to 30% strength in order to get the most efficient absorption of the fluorine. In the preferred purification of the phosphoric acid, where hydrogen sulfide and iodide have been used to precipitate the heavy metal impurities, the excess hydrogen sulfide is first removed by blowing the acid with air, and the blown acid is then filtered through a bed of active carbon to remove the excess iodine.

While the natural hydrated silicas such as kieselguhr, tripolite and the like are not as effective in their natural state as the prepared silicas, their activity as fluorine adsorbents may be markedly improved by treating them with an acid such as sulfuric or hydrochloric and then washing, prior to their use as adsorbents.

The foregoing description has been given for clearness of understanding only, and no unnecessary limitations should be understood therefrom, but the appended claims should be construed as broadly as permissible, in view of the prior art.

We claim:

1. A process for the substantially complete removal of a fluorine compound from phosphoric acid containing such compounds which comprises contacting the phosphoric acid with an adsorbent hydrated silica material prepared from vermiculite by leaching away non-siliceous materials, the amount of hydrated material being greatly in excess of its combining proportions with the fluorine compound.

2. The method as set forth in claim 1, in which the amount of hydrated silica material is at least ten times the chemical equivalent of all fluorine compounds present.

3. The method as set forth in claim 1, in which the hydrated silica is added in successive portions.

4. A process for the substantially complete removal of fluorine compounds from phosphoric acid containing such compounds, which comprises treating the phosphoric acid with an adsorbent hydrated silica prepared from vermiculite by leaching away non-siliceous materials in an amount in excess of the chemical equivalent of the fluorine in the acid, withdrawing the phosphoric acid from the silica and treating it with a second batch of hydrated silica.

5. A process for the removal of fluorine impurities from phosphoric acid containing the same, which comprises passing the phosphoric acid through successive layers of granular powdered or flaked hydrated silica prepared from vermiculite by leaching away non-siliceous materials.

6. The method as set forth in claim 5, in which the hydrated silica is reactivated by washing with water or aqueous solutions.

7. The process of treating phosphoric acid containing fluorine, which comprises contacting the acid with an adsorbent hydrated silica material prepared from vermiculite by leaching away non-siliceous materials in an amount greatly in excess of the combining proportions of said silica material and the fluorine compound in the acid, and maintaining contact with the hydrated silica material until the fluorine content of the acid has been reduced to a final content below 200 p. p. m.

8. The method as set forth in claim 7, in which the phosphoric acid is contacted with successive batches of silica material to reduce its fluorine content to the required degree.

9. The method as set forth in claim 7, in which the fluorine is reduced to a final content of the order of 5 p. p. m.

10. A process for the substantially complete removal of fluorine compounds from phosphoric acid containing such compounds, which comprises contacting the phosphoric acid with an adsorbent hydrated silica material having the skeletal form resulting from the preparation of the material by leaching the non-silicious materials from vermiculite, the amount of hydrated material being greatly in excess of its combining proportions with the fluorine compound.

11. The method of substantially completely removing fluorine compounds from phosphoric acid containing such compounds in a proportion less than the solubility of the corresponding reaction products of silica therewith, which comprises contacting the phosphoric acid with an adsorbent hydrated silica material having the skeletal form resulting from the preparation of the material by leaching the non-silicious materials from vermiculite, the amount of hydrated material being greatly in excess of its combining proportions with the fluorine compound.

WILLIAM H. KNOX, JR.
WARREN STANDISH MILLER.